(12) United States Patent
Okada

(10) Patent No.: US 8,004,699 B2
(45) Date of Patent: Aug. 23, 2011

(54) IMAGE PROCESSING APPARATUS WITH CARD READER SETTING TABLE

(75) Inventor: Yasushi Okada, Hadano (JP)

(73) Assignee: Ricoh Company, Ltd., Tokyo (JP)

( * ) Notice: Subject to any disclaimer, the term of this patent is extended or adjusted under 35 U.S.C. 154(b) by 1012 days.

(21) Appl. No.: 11/896,352

(22) Filed: Aug. 31, 2007

(65) Prior Publication Data

US 2008/0055675 A1   Mar. 6, 2008

(30) Foreign Application Priority Data

Sep. 1, 2006   (JP) ................................ 2006-237470

(51) Int. Cl.
*G06K 15/00* (2006.01)
*G03G 21/02* (2006.01)
*G03G 15/00* (2006.01)

(52) U.S. Cl. ............. 358/1.14; 399/79; 399/80; 399/81; 399/107; 399/125

(58) Field of Classification Search ................ 358/1.14; 399/79, 80, 81, 107, 125
See application file for complete search history.

(56) References Cited

U.S. PATENT DOCUMENTS

| 6,873,806 B2 * | 3/2005 | Kobayashi et al. ............. 399/80 |
| 2002/0071035 A1 | 6/2002 | Sobol ............................. 348/373 |
| 2005/0261018 A1 | 11/2005 | Yamamoto ...................... 455/522 |
| 2005/0275872 A1 | 12/2005 | Otzuki ........................... 358/1.15 |
| 2007/0098427 A1 * | 5/2007 | Katsuhara ........................ 399/75 |

FOREIGN PATENT DOCUMENTS

| EP | 1 657 904 A1 | 5/2006 |
| JP | 2003-169181 | 6/2003 |
| JP | 2003-196618 | 7/2003 |
| JP | 2004-272932 | 9/2004 |
| JP | 2004-356822 | 12/2004 |
| JP | 2005-051336 | 2/2005 |
| JP | 2005-110086 | 4/2005 |

OTHER PUBLICATIONS

European Search Report dated Nov. 7, 2007 issued in corresponding European Patent Application No. 072534020.9-2202.

* cited by examiner

*Primary Examiner* — Twyler L Haskins
*Assistant Examiner* — Fred Guillermety
(74) *Attorney, Agent, or Firm* — Harness, Dickey & Pierce, P.L.C.

(57) ABSTRACT

A scanner section, a printing section, and an operation section having an input section for receiving operational information and a display section are provided. A setting table section is provided and is formed from non-contact type and contact type IC card reader use sections, in which the non-contact type and contact type IC card readers are arranged, respectively. The non-contact type and contact type IC card reader use sections are closer to and farther from an operator, respectively.

14 Claims, 5 Drawing Sheets

VIEW. P

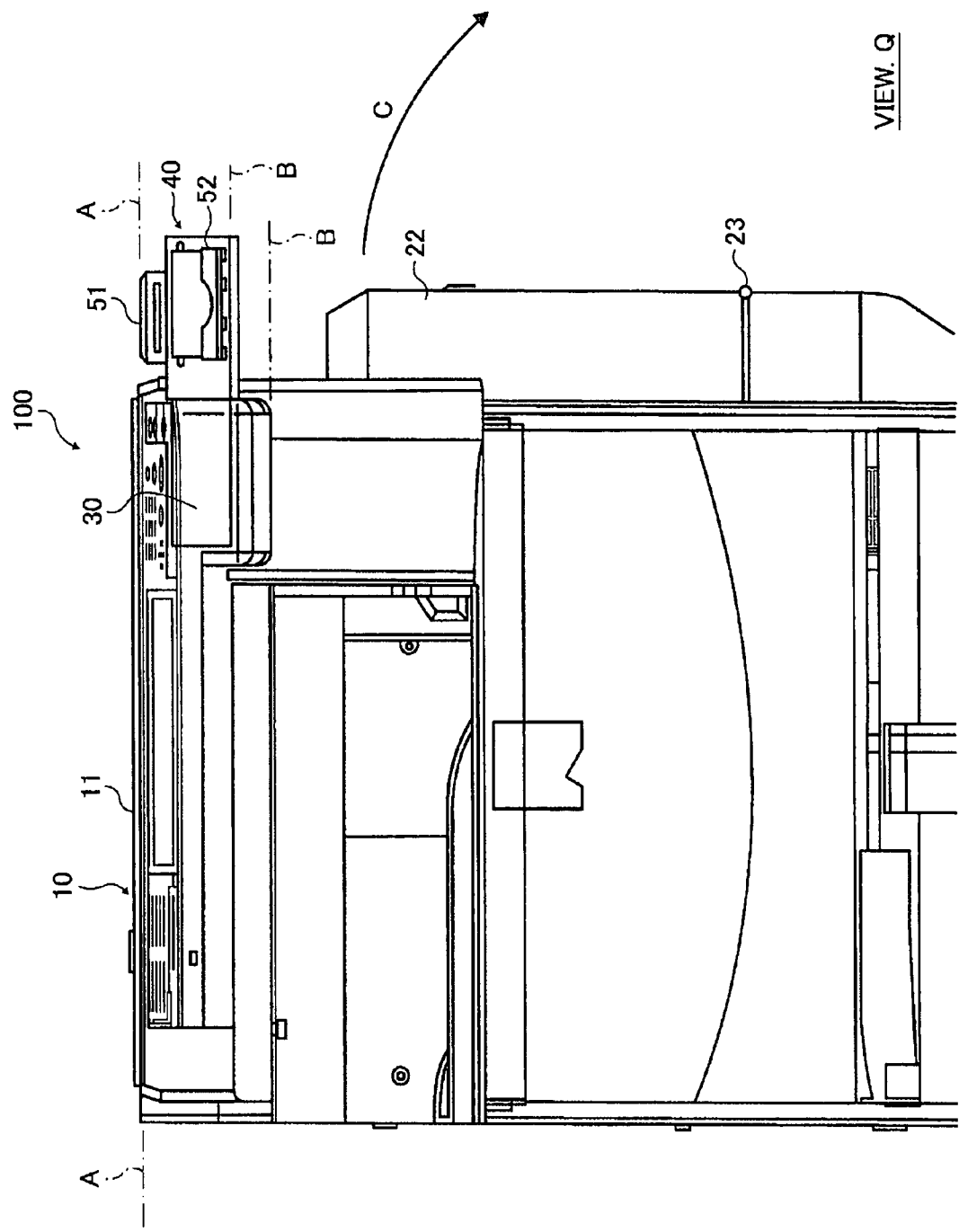

IMAGE PROCESSING APPARATUS WITH CARD READER SETTING TABLE

CROSS REFERENCE TO RELATED APPLICATION

This application claims priority under 35 USC §119 to Japanese Patent Application No. 2006-237470, filed on Sep. 1, 2006, the entire contents of which are hereby incorporated by reference.

BACKGROUND OF THE INVENTION

1. Field of the Invention

The present invention relates to an image processing apparatus, and in particular, to an image processing apparatus including a setting table on which both contact and non-contact type card readers are arranged keeping their operationality.

2. Discussion of the Background Art

A scanner, a printer, a copier, and a facsimile or the like is known as an image processing apparatus that handles image data of an image or a document.

Such an image processing apparatus serves as a terminal on the network, recently.

When operating as such a terminal, the image processing apparatus reads a visual image and obtains and transmits image data to a prescribed personal computer on the network. Upon receiving from a personal computer, an image processing apparatus prints out the image data in a state of a visual image. Beside originally included image processing functions, such as image reading, image printing etc., the image processing apparatus includes a different information processing function, such as transmission of a document via email, etc.

Such an image processing apparatus includes a processing unit for image processing private use (i.e., an image processing unit), and a general-purpose information processing unit. An operation of the information processing unit is controlled by a general-purpose operating system (OS), for example, and executes functions of the different category.

The above-mentioned different function includes not only the image processing function on the general purpose OS, but also an inspection function to inspect published or non-published information connected to the network and a transmission function to transmit those information. Also included is an accessing function to access a card type external storage media of either a contact or non-contact type (hereinafter, simply referred to as a contact or non-contact type card) as described in the Japanese Patent Application No. 2004-356822.

As an image processing unit having the accessing function, a contact type IC card installation apparatus that includes a plurality of slot mechanisms capable of detachably installing an IC card (one example of the contact type card) is exemplified as described in the Japanese Patent Application No. 06-35566.

As described in the Japanese Patent Application No. 06-35566, since the IC card slot is arranged below the rear side of a keyboard, the keyboard is arranged above the IC card slot as a result.

Further, since the non-contact type IC card reader executes data communications with an antenna built in the non-contact type IC card using electromagnetic wave, a desired communication function cannot be exerted when a substrate, such as a keyboard, or a metal is arranged adjacent to the non-contact type IC card reader. As a result, data communication with an IC card is likely interrupted.

Further, admitting that the apparatus can be downsized and thinned when the IC card slot is arranged below the backside, an inserting performance of the contact type IC card, etc., likely decreases.

SUMMARY OF THE INVENTION

The present invention has been made in view of the above noted and another problems and one object of the present invention is to provide a new and noble image processing apparatus. Such a new and noble image processing apparatus includes a card reader setting table that carries non-contact type and contact type card readers while maintaining operationality of an operator.

In another aspect of the present invention, a portion of the card reader setting table in front of the operator is assigned as a non-contact type card reader setting section, while a relatively backside portion thereof is assigned as a contact type card reader setting section.

In yet another aspect of the present invention, the image processing apparatus includes an image reading device that reads an original document and obtains image data therefrom. An image forming device is provided to form an image on a prescribed medium in accordance with the image data. An operation section is provided and includes an input part for receiving an instruction and a display part.

In yet another aspect of the present invention, the setting table carrying contact and non-contact type card readers in the respective front and backside portions thereof, respectively.

In yet another aspect of the present invention, the contact type and non-contact type card readers each inputs and outputs information to and from contact type and non-contact type information recordable cards, respectively.

In yet another aspect of the present invention, the non-contact type card includes a wireless IC card.

In yet another aspect of the present invention, the setting table includes almost a reverse V-letter shape at its cross section. A folding section of the reverse V-letter is preferably formed between the non-contact type and contact type IC card reader use sections.

In yet another aspect of the present invention, the contact type IC card reader use section inclines with its front side being higher and with its backside being lower.

In yet another aspect of the present invention, the setting table section is arranged lower than an eye level of an average operator. The front side opening of the contact type IC card reader takes the upward posture toward the operator.

In yet another aspect of the present invention, the lowest section among the setting table section and the contact type and non-contact type IC card readers is positioned higher than the lower section of the operation section.

In yet another aspect of the present invention, a position of the highest portion among those is lower than the original document setting surface on which a reading use original document is set.

In yet another aspect of the present invention, a peripheral instrument with an openable door is arranged below the operation section to deal with ejected sheets or to remove jammed sheets.

In yet another aspect of the present invention, the highest section among the setting table section and the contact type and non-contact type IC card readers is lower than the vertical height of the original document placing surface.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a front view of the digital multifunctional copier of FIG. 1 when viewed from a direction shown by an arrow Q.

DETAILED DESCRIPTION OF EXAMPLE EMBODIMENTS

Figure 1:
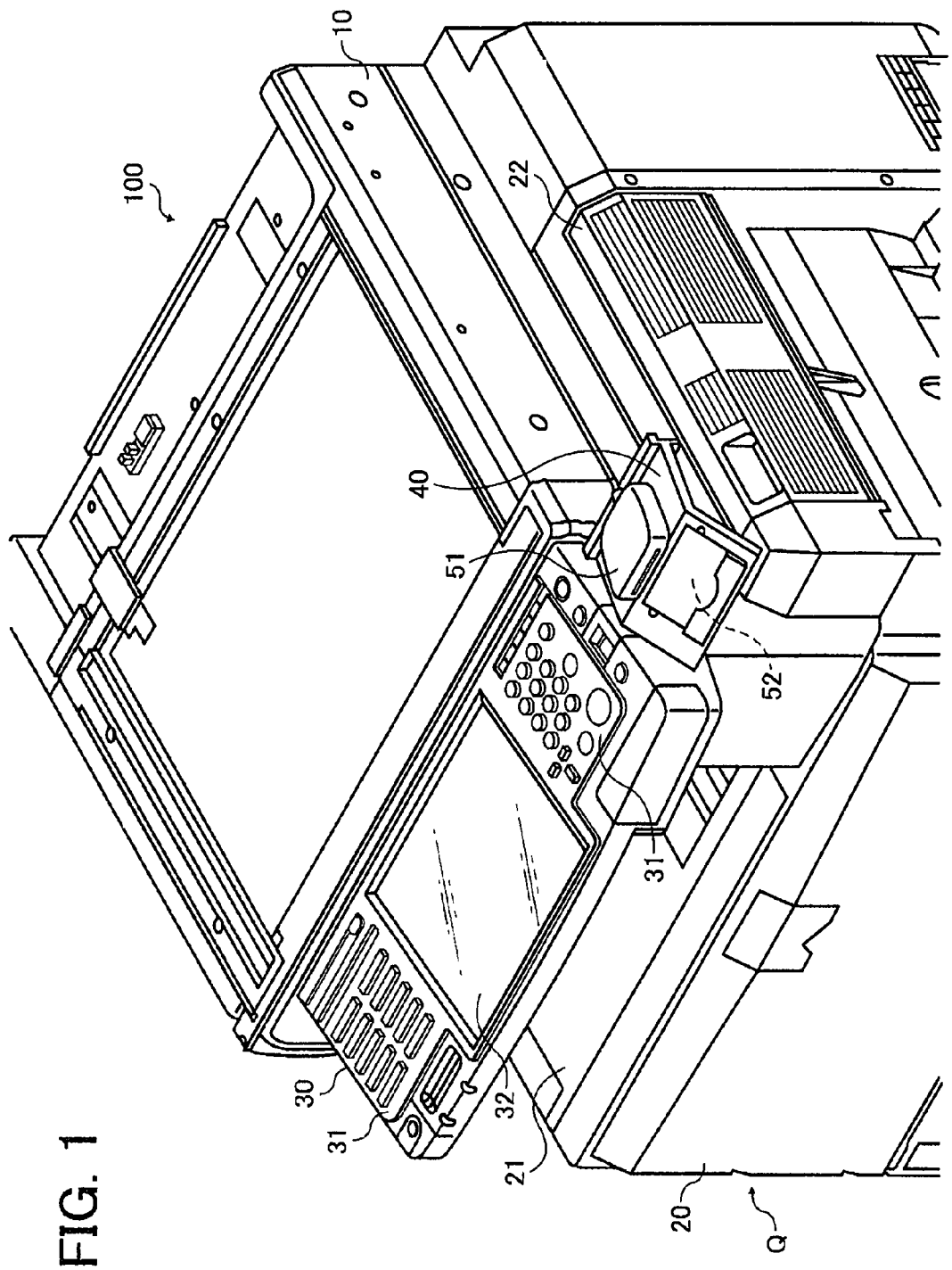
FIG. 1 is a perspective view illustrating the entire digital multifunctional copier as one exemplary embodiment of an image processing apparatus according to the present invention.

Referring now to the drawings, wherein like reference numerals and marks designate identical or corresponding parts throughout several figures, in particular in FIG. 1, the digital multi functional copier 100 includes a scanner section 10 (e.g. an image reading device) for reading an original document and acquiring image data, a printer section 20 (e.g. an image forming device) for printing an image on a sheet medium in accordance with the image data, and an operation section 30 having an input section 31 for receiving an input in accordance with instruction and a display section 32.

Figure 2:
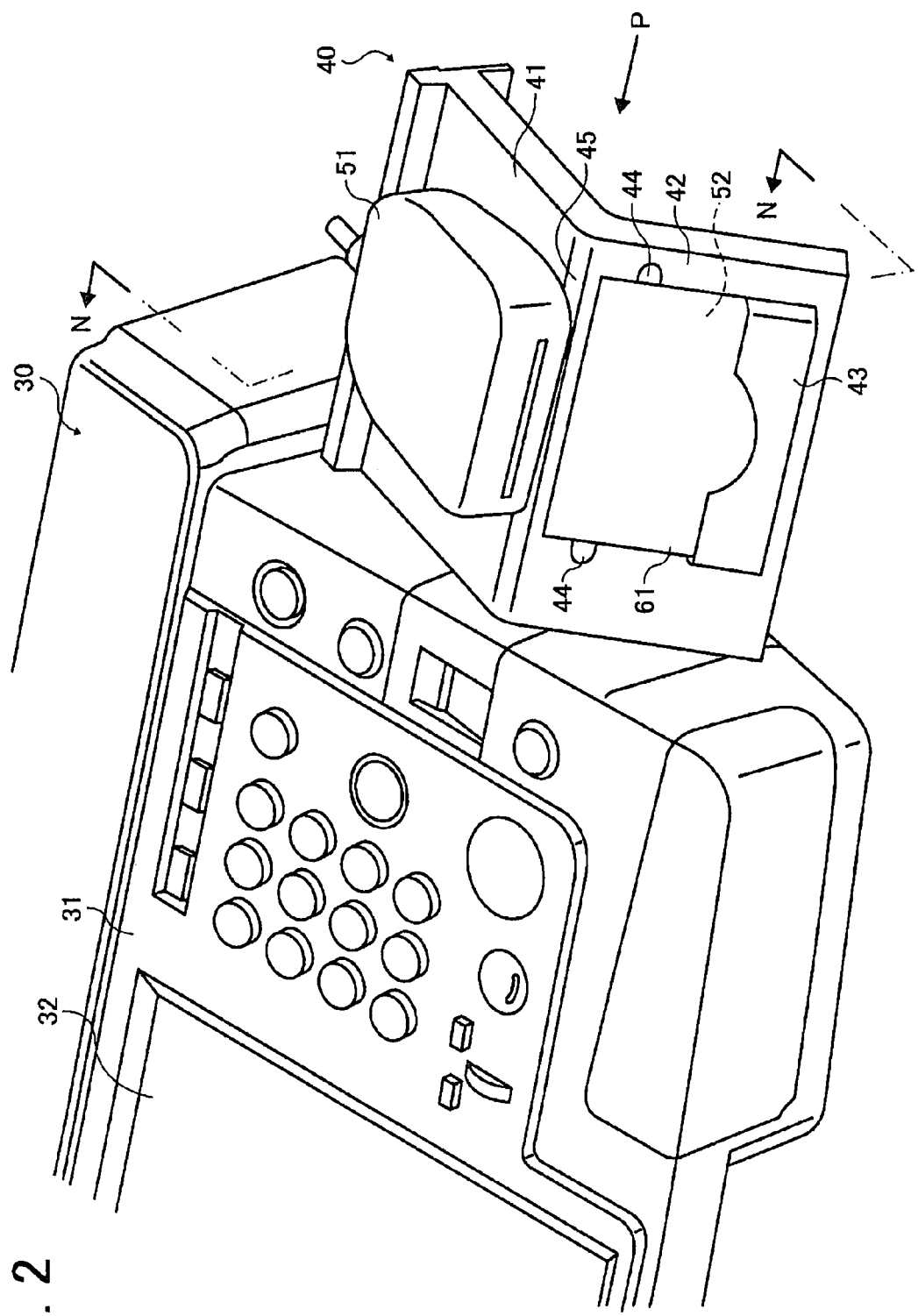
FIG. 2 is a perspective view illustrating a detail of an exemplary setting table included in the digital multifunctional copier of FIG. 1.

Also included is a setting table section (e.g. a setting table) 40, on which contact and non-contact type IC card readers 51 and 52 are arranged to input and output information into and from contact and non-contact type IC cards 61 (see FIG. 2 and not shown, respectively).

In the scanner section, an openable cover, not shown, is attached to prevent entry of external light, but is in the drawings.

21 denotes a sheet ejection section for a sheet medium printed at the printing section 20. 22 denotes an openable door for allowing accessing the interior of the printer 20 for the purpose of removing a sheet medium jammed therein.

The scanner section 10 is arranged in the backside, while the operation section 30 the front side of the digital multi functional copier 100.

As shown in FIG. 2, a section closer to an operator serves as a non-contact type IC card reader use section 42 in which the non-contact type IC card reader 52 is arranged in the setting table section 40. Whereas, farther section from the operator serves as a contact type IC card reader section 41 in which the contact type IC card reader 51 is arranged.

Further, the setting table 40 includes a reverse V-letter shape (i.e., an upwardly concaved shape) at its cross section along the line N-N (i.e., a vertical plane) in FIG. 2. A folding section 45 of the reverse V-letter is located between the non-contact and contact type IC card reader use sections 42 and 41.

Figure 4:
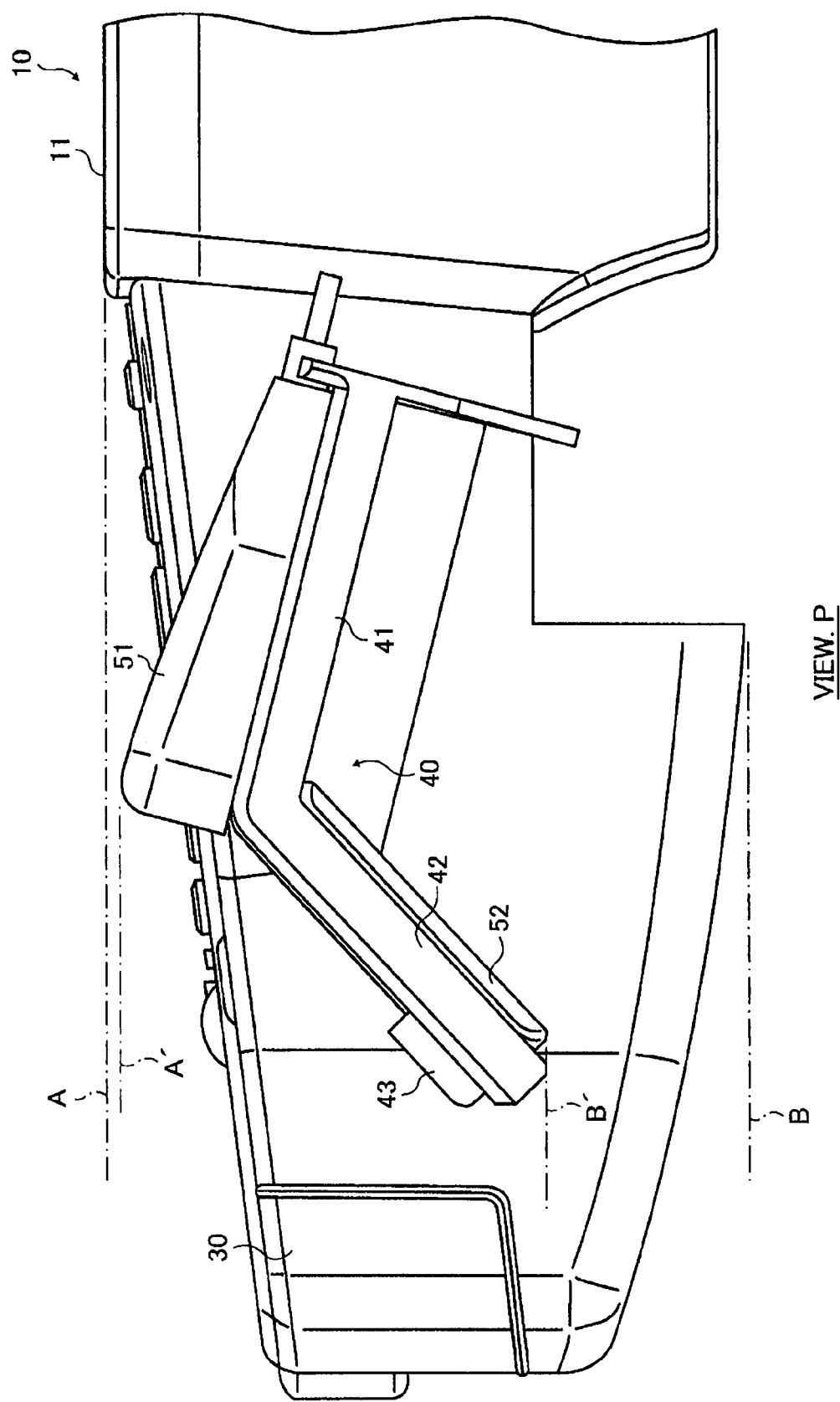
FIG. 4 is a side view of the setting table of FIG. 2 when viewed from a direction shown by an arrow P.

Further, as shown in FIGS. 4 and 5, the setting table 40 and the contact and non-contact type card readers 51 and 52 are located so that the lowest section B' among the setting table 40 and the contact and non-contact type card readers 51 and 52 is positioned higher than the lower surface position B of the operation section 30, while the highest section A' among those is located lower than a position A of an original document placing surface 11 of the scanner section 10, onto which an reading use original document is placed.

Figure 3:
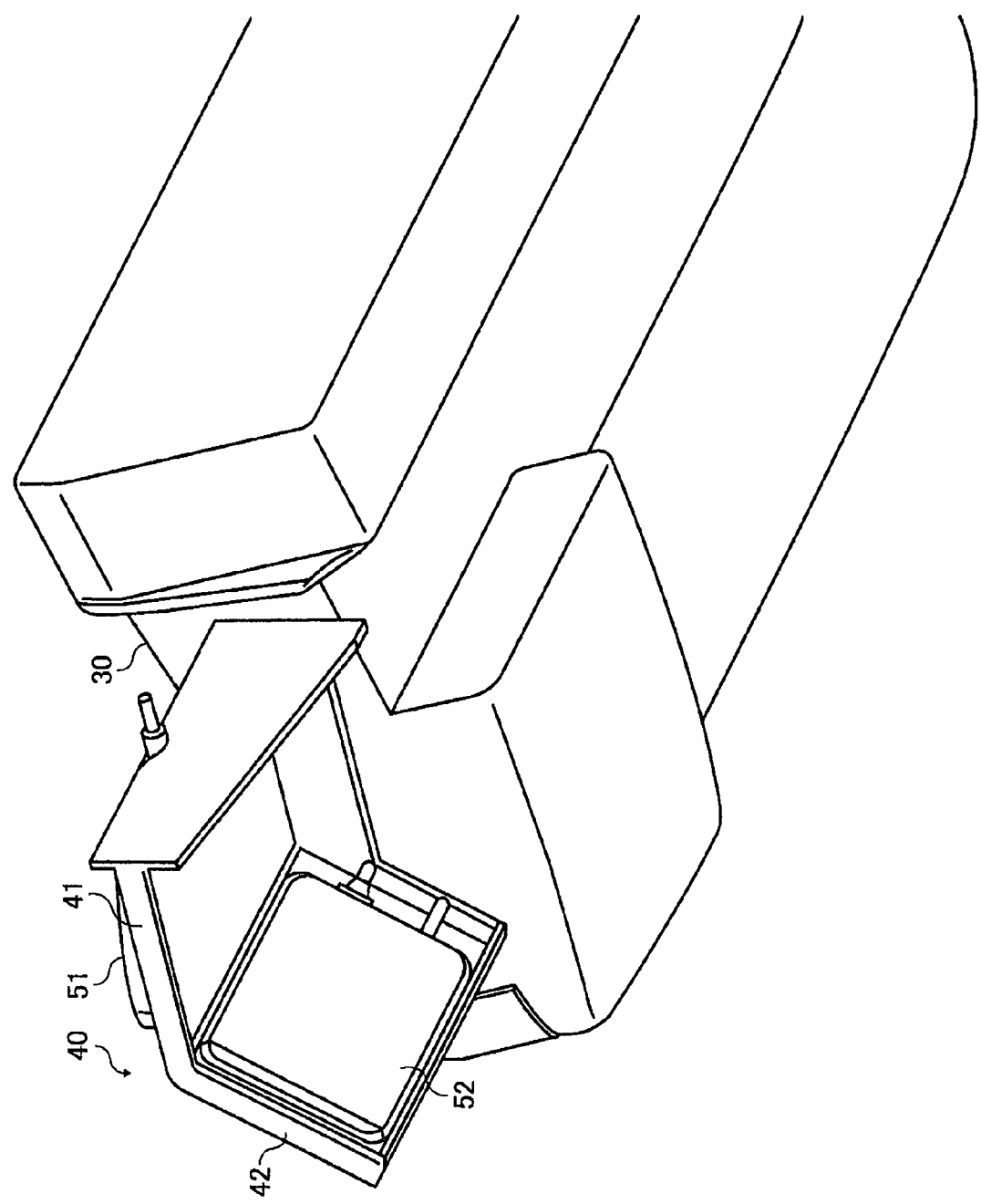
FIG. 3 is a perspective view of the setting table of FIG. 2 when viewed from below a backside.

As shown in FIG. 3, the non-contact type IC card reader 52 is arranged on the backside of the non-contact type IC card reader use section 42 of the setting table 40.

On the front side of the non-contact type IC card reader use section 42, there is provided a holder 43 serving as a standby section for the contact type IC card 61 when the contact type IC card reader 51 is detached or the like.

The contact type IC card 61 includes a recordation of information enabling usage of various functions of the digital multi functional copier 100. For example, when the digital multi functional copier 100 is commonly used by a plurality of divisions, and usage frequency and a number of used sheets are monitored per division, a contact type IC card 61 is distributed per division. By inserting the contact type IC card 61 assigned to an own division into the contact type IC card reader 51, the operator can use the digital multi functional copier 100. After usage of the digital multi functional copier 100, the operator can cause the digital multi functional copier 100 to be locked in a stopping condition by extracting the contact type IC card 61 from the contact type IC card reader 51.

When monitoring per division is needless, the contact type IC card 61 can be used while always being inserted into the contact type IC card reader 51.

On the other hand, the non-contact type IC card is assigned and delivered to each person and include ID use information or the like identifying an operator. Thus, by reading the ID use information or the like with the non-contact type IC card reader 52, the digital multi functional copier 100 can be used within an authorized range in accordance with the ID information or the like.

The ID use information or the like recorded in the non-contact type IC card is also used to authorize entrance and exist to and from each division. The non-contact type IC card is carried by an operator via a cardholder attached to a neck strap while being inserted into the cardholder.

As shown in FIG. 5, an openable door 22 is located below the operation section 30, and is open when swung around a hinge 23 in a direction shown by an arrow C. In the open state, the interior of the printer 20 can be accessed. When the openable door is swung from the open state in an opposite direction to the arrow C, it is closed, and the accessing the interior is interfered.

Thus, according to the present embodiment of the digital multi functional copier 100, since the non-contact type IC card reader 52 is arranged at the section (i.e., the non-contact type IC card reader use section 42) closest to the operator, a distance between the operator and the non-contact type IC card reader 52 arranged on the setting table section 40 becomes closer. Thus, the operator can access the information recorded in the non-contact type IC card 62 only by directing the non-contact type IC card 62 toward the non-contact type IC card reader 52 while putting on the strap with the non-contact type IC card 62 being in the card holder.

Accordingly, the system can employ both of the contact and non-contact type IC card readers 51 and 52 while suppressing decrease in operationality of an operator.

Further, although the non-contact type IC card reader 51 is arranged on the backside farther than the contact type IC card reader use section 41 from the operator, it can be easier for the operator to visually recognize if the contact type IC card 61 is inserted into the contact type IC card reader 51, i.e., a condition of the front side, than when the contact type IC card reader 51 is arranged in the front side section (i.e., the non-contact type IC card reader section 42) closer to the operator. Because, the contact type IC card reader 61 is designed so that the contact type IC card 51 is inserted from a front side of the contact type IC card reader 51 facing the operator.

According to the above-mentioned digital multi functional copier 100, since the setting table 40 includes a reverse V-letter shape at a cross section, and a folding section 45 of the reverse V-letter is located between the non-contact and contact type IC card reader use sections 42 and 41, the contact type IC card reader use section 41 is located on the backside of the folding section in the widthwise direction when viewed from the operator, and inclines with its front side being higher and its backside being lower.

Since the setting table section 40 is lower than an eye level of an average operator, the operator looks down the setting table 40. Since the contact type IC card reader 51 is arranged on the backside of the reverse V-letter shaped folding section 45 in such a situation, the front side opening of the contact type IC card reader 51 takes the upward posture in relation to the operator.

Accordingly, eyes of the operator readily catch the front side surface opening of the contact type IC card reader 51 from the front side. As a result, he or she can more likely reduce looking over as to if a contact type IC card 61 is inserted into the contact type IC card reader 51.

Further, since the cross section of the setting table section 40 is almost shaped in a reverse V-letter, a height can be more reduced and thereby the setting table section 40 is thinner than a setting table section formed from simply flat plates, on which both contact type and non-contact type IC card readers 51 and 52 are arranged up and down vertically, respectively.

Since these setting table section 40, and the contact type and non-contact type IC card readers 51 and 52 are arranged in the digital multi functional copier 100, such that a vertical position B' of the lowest portion among these setting table section 40, and the contact type and non-contact type IC card readers 51 and 52 is higher than a vertical position B of the lower side of the operation section 30, and such that a vertical position A' of the highest portion among those is lower than a vertical position A of the original document setting surface 11 on which a reading use original document is set, the openable door 22 can be arranged below the operation section 30 for the purpose of ejection of sheets or removal of jam sheets.

For the same reason, an original document significantly larger enough than a readable range on an original document setting surface 11 can be read.

Specifically, since the openable door 22 is arranged below the operation section 30 for the purpose of dealing with jammed sheets or ejection of sheets, the digital multi functional copier 100 can be downsized. Further, since the vertical position B' of the lowest portion among these setting table section 40, and the contact type and non-contact type IC card readers 51 and 52 is higher than the vertical position B of the lower side of the operation section 30, the openable door 22 does not interfere the setting table section 40, and the contact type and non-contact type IC card readers 51 and 52, and thereby a performance of the openable door 22 is not decreased even when the openable door 22 is swung both in a direction shown by an arrow C and in its opposite direction (i.e., clockwise and counter clockwise).

When openable door 22 is opened or closed, the operator necessarily brings his or her face close to the openable door 22. However, according to the digital multi functional copier 100 of this embodiment, a wide space allowing the face to be brought close thereto can preferably be created above the openable door 22.

Further, as mentioned earlier, a sheet medium printed in a printing section 20 is ejected to an ejection section 22. However, when a setting table section 40 is arranged on the left side of the operation section 30 as shown in FIG. 5, and if the lowest position B' is lower than the position B, a hand of an operator tends to hit the lowest portion of the setting table section 40 or the like downwardly protruding from the lower side of the operation section 30 when the operator inserts his or her hand into the sheet ejection section 22 and removes an ejected sheet medium, and withdraws his or her hand from the sheet ejection section 22. Thus, operability becomes deteriorated. However, according to the digital multi functional copier 100, the operability problem is resolved because the lowest position B', and the contact type and non-contact type IC card readers 51 and 52 is located higher than the position B.

An original document larger than a readable range of an original document placing surface 11 is sometimes placed thereon. However, since the highest position A' is lower than the position A, the original document almost never overlies the setting table section 40 and the contact type and non-contact type IC card readers 51 and 52. Accordingly, the original document can tightly come into contact with the original document placing surface 11. As a result, influence from entrance of external light caused when tight contact is not created can be reduced.

Further, a function limited to exert in the digital multi functional copier 100 can be unlimited only when the non-contact type IC card reader is held in the holder 43.

In such a situation, since the non-contact type IC card reader use section 42 inclines, the surface of the non-contact type IC card (the same goes in the contact type IC card 61) tightly contacts with an inclination surface of the non-contact type IC card reader use section 42. Thus, the non-contact type IC card is hardly detached from the holder 43. However, since convex finger hook sections 44 are formed to accept insertion of fingers into the rear side of the non-contact type IC card according to the embodiment, the non-contact type IC card is easily peeled off from the non-contact type IC card reader use section 42.

Further, the non-contact type IC card is transmissible and accessible through nonmetal, since the non-contact type IC card reader use section 42 is made of nonmetal such as plastic, and the non-contact type IC card reader 52 is arranged on the backside of the non-contact type IC card reader use section 42 as shown in FIGS. 3 and 4, the non-contact type IC card reader 52 can hardly be seen from the outside. Thus, the non-contact type IC card reader 52 is hardly detached and thereby being advantageous for preventing from theft.

Further, even if the operator cannot precisely recognize a position of the non-contact type IC card reader 52, he or she can access by directing the non-contact type IC card toward the position of the holder 43 as a clue.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An image processing apparatus, comprising:
  one of an image reading device configured to read an original document and obtain image data therefrom and an image forming device configured to form an image on a prescribed medium in accordance with image data;

an operation section including an input section receiving an instruction;

a display section; and a setting table including contact and non-contact type card readers, said contact and non-contact type card readers each inputting and outputting information to and from contact type and non-contact type information recordable cards, respectively;

wherein said setting table includes a non-contact type card reader use section which is closer to an operator, and a contact type card reader section which is farther from the operator, said setting table has a V-letter like cross section being concave upwardly, and a folding section of the V-letter like cross section is located between the contact and non-contact type card reader use sections.

2. The image processing apparatus as claimed in claim 1, wherein a lowest section among said setting table and the contact type and non-contact type card readers is positioned higher than a lower surface of the operation section, and wherein a highest section among said setting table and the contact type and non-contact type card readers is positioned lower than an original document placing surface onto which a reading use original document is placed.

3. The image processing apparatus as claimed in claim 1, wherein the non-contact type card reader is arranged on a backside of the non-contact type card reader use section of the setting table.

4. The image processing apparatus as claimed in claim 1, wherein the non-contact type card use section further includes a holder provided on a front side thereof, serving as a standby section for the contact type information recordable card when the contact type card reader is detached.

5. The image processing apparatus as claimed in claim 1, wherein the non-contact type card use section further includes convex finger hook sections to accept insertion of fingers of the operator into a rear side of the non-contact type information recordable card.

6. The image processing apparatus as claimed in claim 1, wherein the non-contact type card reader use section is made of non-metal.

7. The image processing apparatus as claimed in claim 6, wherein the non-metal is plastic.

8. The image processing apparatus as claimed in claim 1, wherein the non-contact type card reader is arranged on a frontside of the folding section in a width-wise direction when viewed from the operator, and the contact type card reader is arranged on a backside of the folding section in a width-wise direction when viewed from the operator.

9. The image processing apparatus as claimed in claim 1, wherein the frontside of the folding section having the non-contact type card reader placed thereof is arranged in an upward direction.

10. The image processing apparatus as claimed in claim 9, wherein the contact type information recordable card is inserted from a front side of the contact type card reader facing the operator.

11. The image processing apparatus as claimed in claim 1, wherein the contact type information recordable card includes recording information enabling usage of various functions of the image processing apparatus.

12. The image processing apparatus as claimed in claim 11, wherein the various functions include at least one of usage of divisions, usage frequency and a number of used sheets monitored per division.

13. The image processing apparatus as claimed in claim 11, wherein the non-contact type information recordable card is assigned to each operator, including identification use information, identifying the operator.

14. The image processing apparatus as claimed in claim 13, wherein both of the contact and non-contact type card readers can be operated at the same time.

* * * * *